J. BURKHART.
NUT LOCK.
APPLICATION FILED FEB. 3, 1910.

974,641.

Patented Nov. 1, 1910.

Witnesses
W. H. Rockwell
James L. Shelly

Inventor
Jacob Burkhart
By James W. Bevans
Attorney

UNITED STATES PATENT OFFICE.

JACOB BURKHART, OF ABERDEEN, PENNSYLVANIA.

NUT-LOCK.

974,641.   Specification of Letters Patent.   Patented Nov. 1, 1910.

Application filed February 3, 1910. Serial No. 541,853.

*To all whom it may concern:*

Be it known that I, JACOB BURKHART, a citizen of the United States, residing at Aberdeen, in the county of Lackawanna and State of Pennsylvania, have invented certain new and useful Improvements in Nut-Locks, of which the following is a specification.

This invention relates to improvements in nut-locks, and the object is to provide a simple and effective construction of lock which may be easily and readily applied or operated to release the nut, but which in use will securely hold the nut from accidental displacement.

With the above object in view, the invention consists in the novel features of construction hereinafter fully described, particularly pointed out in the claims, and clearly illustrated by the accompanying drawing, in which—

Figure 1:
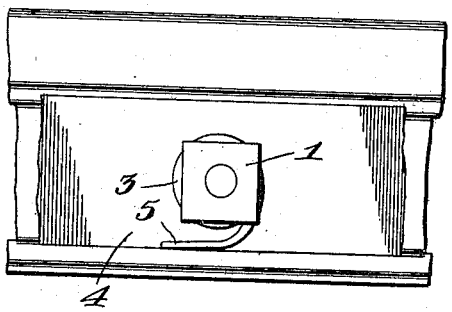
Figure 2:
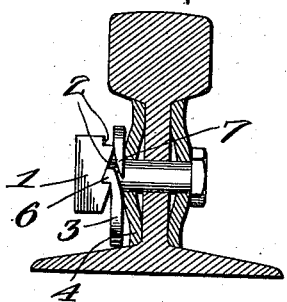
Figure 3:
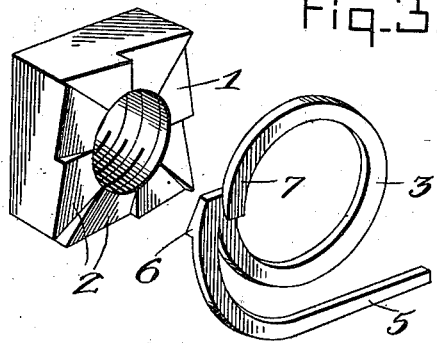

Figure 1 is a side elevation of a portion of a railroad rail and fish-plate showing my improved nut-lock in use; Fig. 2, a vertical sectional view through Fig. 1; Fig. 3, a perspective view of the nut and locking device detached and separated, and Fig. 4, a similar view of a modified construction.

Referring now more particularly to the drawing, Figs. 1, 2 and 3, the numeral 1 designates the nut which is formed with a series of inclined notches 2 on its inner face.

My improved locking device 3 is formed of a single piece of metal bent to substantially the form of a figure 2 reversed. In use, the locking device is positioned between the nut and the fish-plate 4, curving around the bolt with the base 5 of the 2 resting on the base of the rail. Intermediately of its ends, namely, at the point where the loop of the figure 2 joins the stem thereof, an engaging-portion 6 is formed to engage the notches of the nut. The upper or free end of the loop-portion of the locking-device is bent laterally at 7 to engage the fish-plate. The base 5 is made thinner than the major portion of the locking-device so as to permit it to spring and release the nut when it is desired to remove the latter as will be fully set forth.

In applying the locking-device, it is merely necessary to place it over the bolt with the engaging-portion 6 turned out, and the base 5 resting on the base of the rail. The nut may be screwed to place, the engaging-portion 6 slipping over the notches, and the base 5 by engagement with the rail-base preventing turning of the locking-device with the nut. The device forms, in this position, a positive lock for the nut. The nut may be inscrewed by using a heavy wrench, the pressure applied being such as to compress the locking-device, that is the spring-base 5, until the whole device turns with the nut, the base 5 being swung out of contact with the rail-base. In removing the nut, a tool may be used to press the engaging-portion 6 out of the notches of the nut. The end 7 being bent toward and engaging the fish-plate, the engaging-portion 6 is forced into engagement with the notches of the nut.

Figure 4:
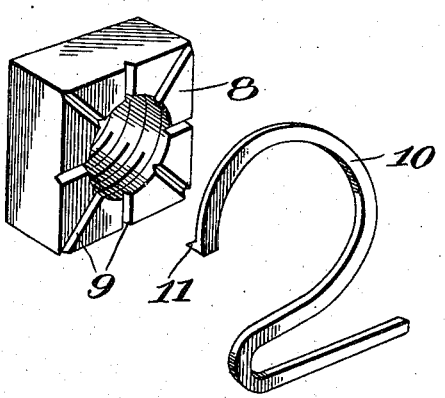

In the locking-device shown in Fig. 4, the nut 8 is formed with V-shaped radial notches 9 on its inner face. The locking-device 10 is in the form of a reversed figure 2 having its upper end formed with an outwardly-facing projection 11 having one face inclined. This projection engages in the notches of the nut, and the locking-device is sufficiently heavy so that the nut will be positively held from backward movement on the bolt, but when sufficient pressure is applied by means of a large wrench, the engaging-portion 11 will be forced out of the notches of the nut.

Having thus fully described my invention what I claim as new and desire to secure by Letters Patent of the United States, is:—

1. A nut lock comprising, in combination with a bolt and a nut having an inner ratchet face, a washer resiliently interposed between said inner face and a surface from which the bolt protrudes, a pawl on said washer co-acting with the ratchet face of said nut, and a tail on said washer abutting the surface from which the bolt protrudes to prevent rotation of the washer and nut, said tail being of a form to yield under excessively heavy pressure caused by mechanical backward rotation of the nut.

2. A nut-lock formed of a single piece of metal of substantially a reversed figure 2 shape adapted to encircle the bolt with its base formed to yield under heavy pressure and resting on the base of the rail and having a portion engaging the nut.

3. A nut-lock formed of a single piece of metal of substantially a reversed figure 2 shape adapted to encircle the bolt with its base in contact with the base of the rail and having a portion engaging the nut, said base of the nut-lock being so formed that when heavy pressure is applied to unscrew the nut, the base will yield so as to permit it to swing clear of the rail-base.

In testimony whereof I affix my signature in presence of two witnesses.

JACOB BURKHART.

Witnesses:
ANDREW NAGLEY,
C. N. VOGELBUCHER.